US007082255B1

(12) United States Patent
Jun

(10) Patent No.: US 7,082,255 B1
(45) Date of Patent: Jul. 25, 2006

(54) METHOD FOR PROVIDING USER-ADAPTIVE MULTI-LEVEL DIGEST STREAM

(75) Inventor: Sung Bae Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 926 days.

(21) Appl. No.: 09/692,316

(22) Filed: Oct. 20, 2000

(30) Foreign Application Priority Data

Oct. 22, 1999 (KR) .................................. 1999-45943

(51) Int. Cl.
*H04N 5/91* (2006.01)
(52) U.S. Cl. .............................. 386/83; 386/94; 725/46
(58) Field of Classification Search ................ 386/46, 386/83, 94, 95; 725/28, 35, 46
See application file for complete search history.

(56) References Cited

U.S. PATENT DOCUMENTS

| 5,278,946 | A  |   | 1/1994  | Shimada et al. |         |
|-----------|----|---|---------|----------------|---------|
| 5,572,728 | A  |   | 11/1996 | Tada et al.    | 395/616 |
| 5,589,945 | A  |   | 12/1996 | Abecassis      | 386/83  |
| 5,828,402 | A  | * | 10/1998 | Collings       | 725/28  |
| 5,913,013 | A  |   | 6/1999  | Abecassis      | 386/125 |
| 6,546,556 | B1 | * | 4/2003  | Kataoka et al. | 725/35  |
| 6,694,090 | B1 | * | 2/2004  | Lewis et al.   | 386/94  |
| 6,704,491 | B1 | * | 3/2004  | Revis          | 386/94  |
| 2003/0020744 | A1 | * | 1/2003 | Ellis et al.  | 345/723 |

FOREIGN PATENT DOCUMENTS

| EP | 0597450 A2 | 11/1993 |
| EP | 0555028 A2 | 5/1994 |
| EP | 0782139 A2 | 7/1997 |
| EP | 0929197 A2 | 7/1999 |
| JP | 03090968   | 8/1991 |
| WO | WO99/03275 | 1/1999 |
| WO | WO99/28835 | 6/1999 |

OTHER PUBLICATIONS

Hashimoto et al. "Digested TV Program Viewing Application Using Program Index" ITE Technical Report, vol. 23, No. 28., Mar. 1999, pp. 7-12, with English-language Abstract.
Yagawa et al. "TV Program Planning Agent Using Analysis Method of User's Taste" Technical Report of IEICE, A198-55, Dec. 1998, pp. 9-16, with English-language Abstract.
Hashimoto et al. "Prototype of Digest Making and Viewing System for Television" Information Broadcasting Laboratories, Inc., 119-23, Jul. 22, 1999, pp. 133-138, with English-language Abstract.
K. Ratakonda, I. Sezan and R. Crinon: "Hierarchical Video Summarization" Proceeding of the SPIE, Conference on Visual Communications and Image Processing 1999, Jan. 25-27, 1999, San Jose, CA; vol. 3653, 1998, pp. 1531-1541, XP002333252.

* cited by examiner

*Primary Examiner*—Huy Nguyen
(74) *Attorney, Agent, or Firm*—Fleshner & Kim, LLP

(57) ABSTRACT

A method for providing a user-adaptive digest stream provides a digest stream of a multimedia stream having a user-desired length and reflecting the user's preference/non-preference. The method for providing a user-adaptive multi-level digest stream can dynamically provide the user-adaptive digest stream according to user preference information. The method can include searching user preference information having user preference/non-preference level by categories for a multimedia stream, and reconstructing a multi-level digest stream information on a multimedia stream as a multi-level digest stream information according to the user preference information, using both the searched user preference information and a content-based data of a multimedia stream. Thereby, it is possible to quickly, accurately and conveniently provide a multi-level digest stream corresponding to the user's preference without inputting an additional query condition.

14 Claims, 3 Drawing Sheets

FIG. 3

| | NON-PREFERENCE | | | | | | | | PREFERENCE |
|---|---|---|---|---|---|---|---|---|---|
| | -4 | -3 | -2 | -1 | 0 | 1 | 2 | 3 | 4 |
| DIRECTOR A | | ▨ | | | | | | | |
| DIRECTOR B | | | | | | | | | ▨ |
| DIRECTOR C | | | | | | | | ▨ | |
| GENRE A | | | | | | | | | ▨ |
| GENRE B | | | | | | | ▨ | | |
| GENRE C | ▨ | | | | | | | | |
| GENRE D | | | | | ▨ | | | | |
| ACTOR OR ACTRESS A | | | | | | | | | ▨ |
| ACTOR OR ACTRESS B | | | | | | | | | ▨ |
| ACTOR OR ACTRESS C | ▨ | | | | | | | | |
| PLAYER A | | | | | | | | | ▨ |
| PLAYER B | | ▨ | | | | | | | |
| PLAYER C | | | | | | | | ▨ | |
| TEAM A | | | | | | | | | ▨ |
| TEAM B | ▨ | | | | | | | | |
| ⋮ | | | | | ⋮ | | | | ⋮ |

METHOD FOR PROVIDING USER-ADAPTIVE MULTI-LEVEL DIGEST STREAM

BACKGROUND OF THE INVENTION

1. Field of the Invention

The present invention relates to video recognition technology, and more particularly, to a method for providing a multimedia stream.

2. Background of the Related Art

As the digital video technology and the image or video recognition are developed, a user can access a desired information by searching or browsing certain particular segments of the whole stream. In other words, the user can effectively understand the contents of a predetermined video stream by reproducing the video stream and browsing only a desired portion of the video stream or indexing a digest of the video stream without viewing the whole video stream.

For this purpose, processing a multimedia stream in order to describe a content-based data with the whole multimedia stream or its segments and search the content-based data when the user requests a desired multimedia stream has been studied. The content-based data includes an information on the entire contents of a program, such as information on a production company, director and cast, and a semantic information on each segment in a multimedia stream. Such semantic information can include information on the appearance/disappearance of an object or background, occurrence of an event, and relation between objects and events, throughout the multimedia stream.

When the above information is stored in a content-based data region for a multimedia stream, the user can selectively search a desired stream, or browse only a desired portion in a multimedia stream, by retrieving the content-based data. Therefore, if there is a user's request, saying that, for example, "show only the scene in which a main actor appears in close-up," an apparatus employing a method for providing a multimedia stream based on the content-based data outputs the corresponding segment. Here, the content-based data contains an appearance of an audiovisual object, status of an audiovisual object, event, background, and segment information. In addition, the segment information contains start and finish points of time, audiovisual objects representing a segment, text description for a segment, and events shown in a segment.

In U.S. Pat. No. 5,913,013, a content map is constructed by using a method of setting a level of a violence scene, nude scene, portion in which an actor and/or actress appears, etc. and setting a code of segments, and the user can easily browse only the desired portion.

The method for providing a multimedia stream according to the related art will be described in more detail.

FIG. 1 is a diagram illustrating an example of a method for describing a content-based data for a multimedia stream according to the related art, in which a number of comments (comment 1, comment 2, . . . ) are described along with a segment information. As shown in FIG. 1, the comment means an appearance of an audiovisual object, status of an audiovisual object, event, background, and segment information, and Si (i=0, 1, 2, . . . ) means a segment. However, while the above content-based comment helps the user to easily search a desired portion, it is difficult for the comment to properly meet the user's need for understanding the whole contents of the multimedia stream within a short time.

To solve the above problem, an algorithm for describing a multimedia stream in a multi-level digest segment information scheme is proposed.

FIG. 2 is a diagram illustrating a related art multi-level digest segment information scheme and the corresponding multi-level digest stream, in which digest levels (0, 1, 2, . . . ) according to the level importance of segments of a multimedia stream and multi-level digest streams ($H_0$, $H_1$, $H_2$, . . . ) are described. As shown in FIG. 2, the digest stream ($H_0$) consists of digest segments of the digest level (0), the digest stream (H) consists of segments of the digest level (0, 1), and the digest stream ($H_2$) consists of segments of the digest level (0, 1, 2).

The multi-level digest segment information scheme shows a digest stream in multi-levels by giving an importance level to each digest segment. That is, the multi-level digest segment information scheme describes each digest segment not by using a physical data with respect to multi-level digest segments, but by using a segment information and importance level information of the digest segments. However, these related art methods are inconvenient in that the user has to input a filtering condition or search condition on every filtering or search operation, using a content-based data described in a content-based data region or a content map, in order to browse a user-desired segment or contents.

To mitigate the inconvenience, another related art system employs a method for automatically recommending a user-preferred program or providing only segments which the user is likely to want by combining user profile information based on the history of the user, a content map for a multimedia stream, etc. The user profile is stored in a portable nonvolatile memory device such as smart card, a fixed non-volatile memory of a user's terminal, or a non-volatile memory space of a multimedia server. In addition, the user profile is automatically learned from the browsing history of the user, or is updated by the editing of a pre-registered user.

However, most users want to save time by browsing a digest of a multimedia stream before browsing the whole multimedia stream, in order to determine whether to view the whole multimedia stream. With a multi-level digest stream information scheme, content providers can describe multiple versions of highlights with small amount of additional data and the users can request a variety of digest streams of the quantity of 10, 20, and 30 minutes, with respect to an original multimedia stream with a running time of two hours. However, since the method for providing a digest stream gives a level to segments in the order of importance in understanding the whole contents irrespective of various inclinations of the users, a digest stream reflecting each user's preference or character cannot be provided.

Meanwhile, when both of the multi-level digest stream information and the content-based data for the multimedia stream are used, it is possible to meet a request for a multimedia stream based on a user query. However, the related art method for providing a multimedia stream require additional actions, take longer to process and are inconvenient in that the user has to input a condition of a digest, whenever necessary, using a natural language or other interface.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for processing a multimedia stream that substantially obviates one or more problems caused by disadvantages of the related art.

Another object of the present invention is to provide a method for processing a multimedia stream that provides user-adaptive multi-level digest stream (highlight).

Another object of the present invention is to provide a method for providing user-adaptive multi-level digest stream that provides a multimedia stream having a user-desired length and reflecting the user's preference/non-preference to the user without inputting additional query conditions.

Another object of the present invention is to provide user-adaptive multi-level digest stream method that provides a multimedia stream having a user-desired length and reflecting the user's preference/non-preference by using user preference information and a content-based data for a multimedia stream.

Another object of the present invention is to provide a method for providing user-adaptive multi-level digest stream that provides a multimedia stream having a user-desired length and reflecting the user's preference/non-preference by using user preference information and a multi-level digest segment information scheme for a multimedia stream.

To achieve at least the above objects in a whole or in part and in accordance with the purpose of the present invention, as embodied and broadly described, a method for providing user-adaptive multi-level digest stream, according to the present invention is provided that includes searching user preference information having user preference/non-preference level by categories for a multimedia stream, and reconstructing a multi-level digest stream information on a multimedia stream as a multi-level digest stream information according to the user preference information, using both the searched user preference information and a content-based data of a multimedia stream.

To further achieve the above objects in a whole or in part, there is provided a method for providing user-adaptive multi-level digest stream according to the present invention that includes discriminating a user's digest stream request, reading out user preference information of the user who has requested a digest stream, readjusting an importance level of digest segments of information on a multi-level digest stream according to the read user preference information, and providing a digest stream of a user-requested length using the readjusted level of the digest segments.

To further achieve the above objects in a whole or in part, there is provided a method for providing user-adaptive multi-level digest stream according to the present invention that includes setting preference/non-preference levels of user preference categories of a multimedia stream, inputting a content-based data for the multimedia stream, and generating a multi-level digest stream information on the multimedia stream based on the preference/non-preference level and the content-based data of the multimedia stream.

To further achieve the above objects in a whole or in part, there is provided a method for processing a multimedia stream according to the present invention that includes setting preference/non-preference levels of user preference categories of a multimedia stream, inputting a content-based data for the multimedia stream and generating a multi-level digest stream information on the multimedia stream based on the preference/non-preference level and the content-based data of the multimedia stream.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a diagram illustrating user preference information according to a preferred embodiment of the present invention.

DETAILED DESCRIPTION OF PREFERRED EMBODIMENTS

Preferred embodiments according to the present information relate to methods for providing user-adaptive multi-level digest stream that provide a digest stream of a multimedia stream reflecting user preference/non-preference. Such methods can automatically provide user-adaptive multi-level digest stream by setting user preference information (e.g., information described by preference/non-preference levels and preference categories) for user preference categories.

A preferred embodiment of a method for providing user-adaptive multi-level digest stream according to the present invention will now be described. A step of defining preference levels of the contents of a multimedia stream by user preference categories and generating a digest stream according to the preference levels in order to provide user-desired information by filtering for the preferred embodiment will now be described.

FIG. 3 is a diagram illustrating exemplary user preference information according to the preferred embodiment of the present invention, in which user preference categories (director, genre, actor or actress, player, team, . . . ) are described in preference/non-preference levels. As shown in FIG. 3, if the preference categories are described using the preference/non-preference levels, the user can describe a multimedia stream that the user wants to get, and accordingly, can get a digest of the multimedia stream that better reflects the user's preference. The user preference information is preferably stored in a portable nonvolatile memory device, such as a server memory, a client device, and a smart card.

Figure 1:
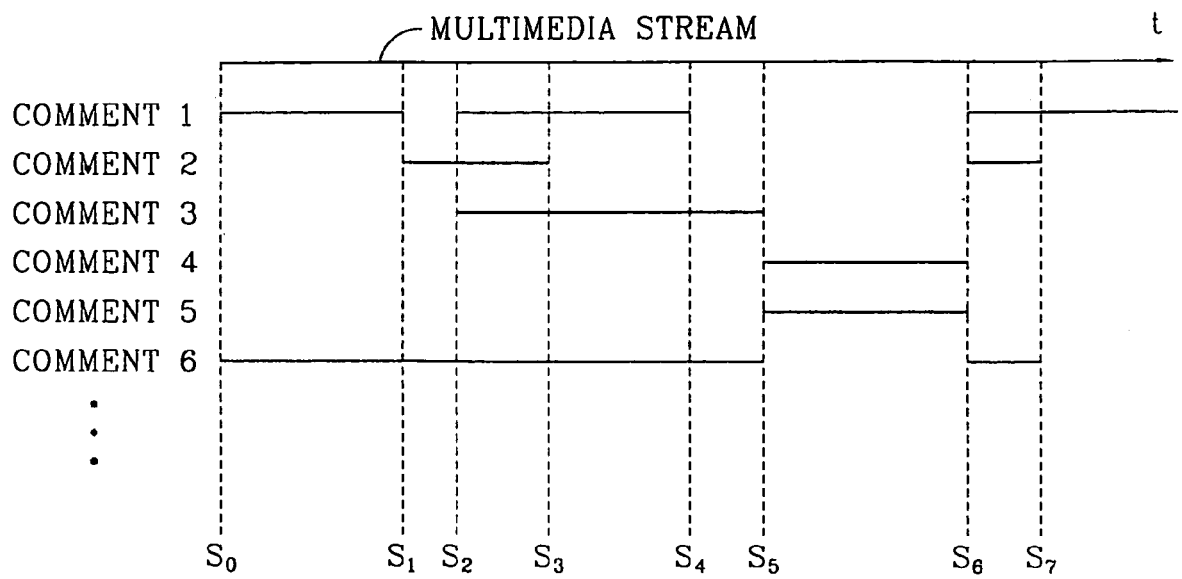
FIG. 1 is a diagram illustrating an example of a method for describing a content-based data for a multimedia stream according to the related art.
Figure 2:
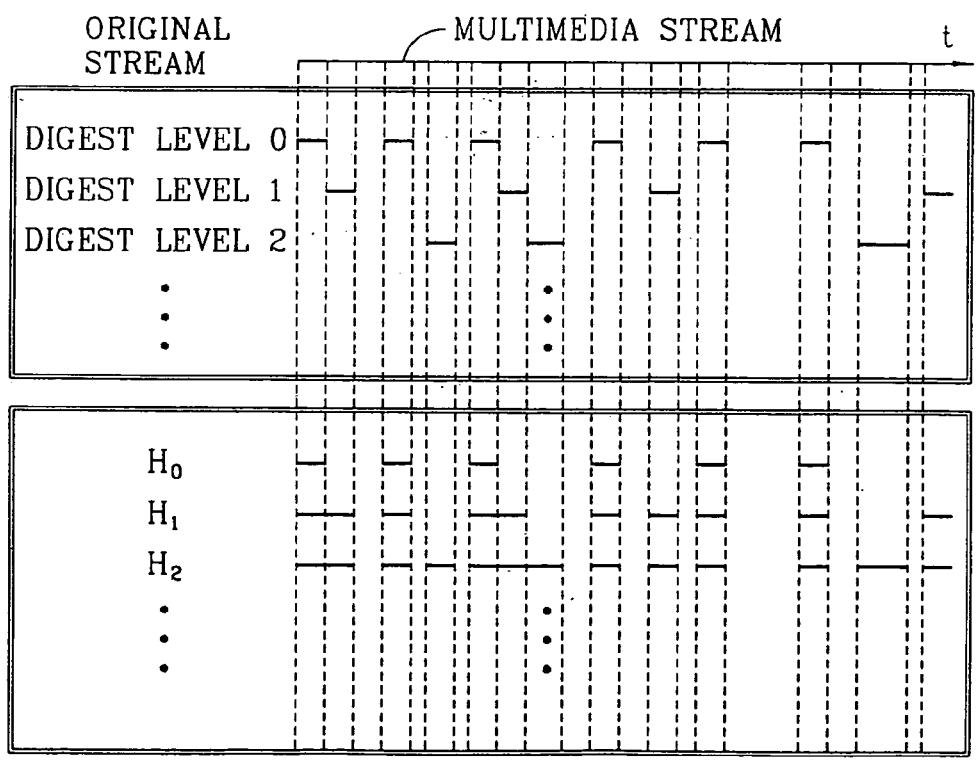
FIG. 2 is a diagram illustrating a multi-level digest segment information scheme and the corresponding multi-level digest streams according to the related art.
Figure 4:
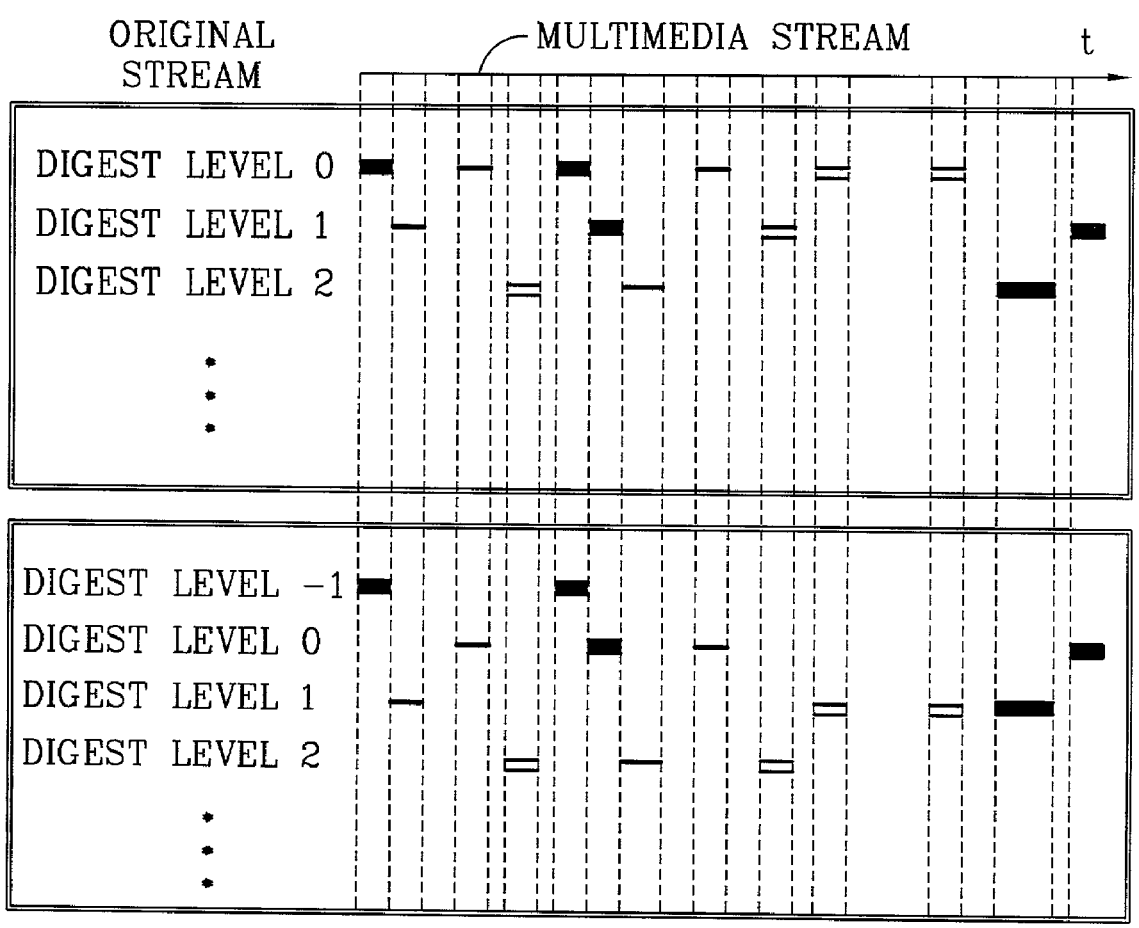
FIG. 4 is a diagram illustrating a method for providing user-adaptive multi-level digest streams a preferred embodiment using both multi-level digest segment information scheme and user preference/non-preference information.

Defining a digest stream of a multimedia using the preference information in the preferred embodiment will now be described. FIG. 4 is a diagram illustrating a multi-level digest segment information scheme and the corresponding multi-level digest stream according to the preferred embodiment. FIG. 4 illustrates a method for describing a multimedia stream MS) in digest level (0, 1, 2, . . . ) using a multi-level digest segment information scheme and a method for describing a multimedia stream MS) in digest level ( . . . , −1, 0, 1, 2, . . . ) using user preference/non-preference data.

As shown in FIG. 4, a thick line indicates a digest segment section preferred by the user, and a double line indicates a digest segment section non-preferred by the user.

As described above, when the user provides an appropriate preference information to a multimedia stream, and selects a digest level or the quantity of a digest stream, the user preference information of the user who has requested a digest stream is read out, and the importance level of digest segments is readjusted according to the read out user preference information. Then, a digest stream having a user-requested length using the readjusted digest segment level is provided, in the preferred embodiment of the method for providing user-adaptive multi-level digest stream according to the present invention.

The information set for the multimedia stream is obtained by comparing a pre-stored user preference information and a content-based data related to the multimedia stream. In other words, it is checked whether the content-based data, such as the operation of an audiovisual object, state of an audiovisual object, event background, segment information, etc. is consistent with the user preference information or not, for thereby reflecting the user preference/non-preference with respect to the categories described in the user preference information.

The multimedia stream can be described in a multi-level digest segment information scheme according to the user preference information, for example, by increasing the level of the digest segment preferred by the user (or decreasing the number of the digest level) and decreasing the level of the digest segment non-preferred by the user (or increasing the number of the digest level). Thus, according to the preferred described digest segment information is constructed as a multimedia stream having a user-desired length and containing a desired digest level information.

As shown in FIG. 4, the level movement of segments preferred by the user and segments non-preferred by the user is described as one-level movement as illustrated in FIG. 3. However, the present invention is not intended to be so limited. For example, the weight value of the preference to each category can be described in multiple levels using −4~4.

Accordingly, in the preferred embodiment of the method for providing a multimedia stream according to the present invention, for example, according to the respective preference information of users of which user A likes news and situation comedies but dislikes sports, and user B likes news and sports but dislikes situation comedies, appropriate programs can be recommended and provided to each user. With respect to the recommended or provided programs, the user can be provided with a multi-level digest stream reflecting the user's preference by effectively searching or browsing the digest stream of the programs.

In addition, in a method for providing a multimedia according to the preferred embodiment, since the above user preference information and the user preference information generated by previously learning from the information using the multimedia stream used by the user (e.g., history information) can be edited by the user, a multi-level digest stream reflecting the user's preference and non-preference and having a desired length can be provided to the user without inputting an additional query condition.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for providing a user-adapted multi-level digest stream, comprising:
searching user preference information having a user preference/non-preference level by categories for a multimedia stream; and
reconstructing a multi-level digest stream information describing the multimedia stream as a user-adapted multi-level digest stream information, including changing an importance level of certain segments of the multi-level digest stream according to the user preference information using both the searched user preference information having the user preference/non-preference levels and a content-based data of the multimedia stream.

2. The method according to claim 1, wherein a user-adapted multi-level digest stream information is dynamically provided according to the user preference information.

3. The method according to claim 1, wherein the content-based data is a description of information including characters, director, production company, appearance/status of an audiovisual object, occurrence of an event, segment characteristics, audiovisual background, and segment information.

4. The method according to claim 3, wherein the user preference information is generated by data editing of the user.

5. The method according to claim 1, wherein the user preference information is generated by data editing of the user.

6. The method according to claim 1, wherein the multi-level digest stream information is formed as a multi-level digest segment information scheme containing the importance level of segments of the multimedia stream and the segment information.

7. The method according to claim 1, further comprising storing the user preference information, wherein the user preference information is stored in an external portable nonvolatile memory unit being a smart card, a nonvolatile memory unit of a predetermined server or a nonvolatile memory unit of a client device.

8. A method for providing a user-adapted multi-level digest stream, comprising:
discriminating a user's digest stream request;
reading out preference information of the user;
readjusting and changing importance levels of information describing digest segments for a requested multi-level digest stream according to the read user preference information; and
providing the requested digest stream of a user-requested length using the readjusted digest segments information.

9. The method according to claim 8, wherein among digest segments whose content-based data is consistent with the user preference information, the importance level of the digest segments preferred by the user is increased and the importance level of the digest segments non-preferred by the user is decreased by comparing the content-based data for the digest segment and the user preference information in the readjusting step.

10. The method according to claim 8, wherein in the readjusting step, the importance levels are readjusted by adding or subtracting a predetermined weight value to preference levels of preferred or non-preferred categories.

11. The method according to claim 8, wherein the user preference information includes user preference/non-preference levels by multimedia categories.

12. A method for processing a multimedia stream, comprising:
    setting preference/non-preference levels of user preference categories of a multimedia stream;
    inputting a content-based data for the multimedia stream; and
    generating a multi-level digest stream information describing the multimedia stream based on the preference/non-preference levels and the content-based data of the multimedia stream, wherein importance levels of the multi-level digest stream information are changed based on the set preference/non-preference levels.

13. The method according to claim 12, comprising:
    providing a user-adapted multi-level digest stream according to the generated multi-level digest stream information.

14. The method according to claim 12, wherein the user preference information is learned from a pattern of accessing to multimedia contents by the user.

* * * * *